US009644989B2

(12) United States Patent
Dhanani et al.

(10) Patent No.: US 9,644,989 B2
(45) Date of Patent: May 9, 2017

(54) NAVIGATION SYSTEM WITH NOTIFICATION AND METHOD OF OPERATION THEREOF (75) Inventors: Salman Dhanani, Palo Alto, CA (US); Lisandro Lejano, Foster City, CA (US)

(73) Assignee: Telenav, Inc., Santa Clara, CA (US)

( * ) Notice: Subject to any disclaimer, the term of this patent is extended or adjusted under 35 U.S.C. 154(b) by 576 days.

(21) Appl. No.: 13/172,780

(22) Filed: Jun. 29, 2011

(65) Prior Publication Data
US 2013/0006520 A1   Jan. 3, 2013

(51) Int. Cl.
*G01C 21/00* (2006.01)
*G01C 21/26* (2006.01)
*G06Q 10/06* (2012.01)
*G01C 21/36* (2006.01)

(52) U.S. Cl.
CPC ..... *G01C 21/3697* (2013.01); *G01C 21/3679* (2013.01)

(58) Field of Classification Search
CPC ...................................................... G01C 21/00
USPC .......... 701/408–412, 420, 424, 445
See application file for complete search history.

(56) References Cited

U.S. PATENT DOCUMENTS

| 6,360,167 | B1 | 3/2002 | Millington et al. |
| 6,611,229 | B2 | 8/2003 | Muramatsu et al. |
| 2004/0260470 | A1* | 12/2004 | Rast ............................... 701/300 |
| 2006/0100778 | A1* | 5/2006 | Lee et al. ....................... 701/210 |
| 2006/0142935 | A1* | 6/2006 | Koerber ......................... 701/200 |
| 2006/0238320 | A1 | 10/2006 | Veliu et al. |
| 2007/0022173 | A1* | 1/2007 | Tamura et al. ................ 709/207 |
| 2007/0073585 | A1 | 3/2007 | Apple et al. |
| 2007/0218891 | A1* | 9/2007 | Cox ............................ 455/422.1 |
| 2007/0288312 | A1 | 12/2007 | Wang |
| 2008/0100475 | A1* | 5/2008 | Horstemeyer ................ 340/994 |
| 2008/0139181 | A1 | 6/2008 | Lokshin |
| 2008/0278345 | A1* | 11/2008 | Van Bosch et al. ...... 340/870.07 |
| 2009/0276318 | A1* | 11/2009 | Broadbent ............. G01C 21/00 705/14.64 |
| 2010/0198692 | A1* | 8/2010 | Hotta et al. .................. 705/14.62 |
| 2010/0228473 | A1* | 9/2010 | Ranford ......................... 701/204 |
| 2010/0332402 | A1* | 12/2010 | Kantarjiev et al. ............ 705/304 |
| 2011/0084825 | A1 | 4/2011 | John |
| 2011/0153191 | A1 | 6/2011 | Dhanani |
| 2011/0238517 | A1* | 9/2011 | Ramalingam et al. ....... 705/26.1 |
| 2012/0223844 | A1* | 9/2012 | Giuli ....................... G08G 1/205 340/993 |

OTHER PUBLICATIONS

International Search Report for PCT Application No. PCT/US2011/042468 dated Nov. 3, 2011.

* cited by examiner

*Primary Examiner* — Yonel Beaulieu
(74) *Attorney, Agent, or Firm* — IP Investment Law Group (57) ABSTRACT

A method of operation of a navigation system includes: receiving a notification associated with a remote location; detecting a user location for locating a device; detecting the user location at the remote location based on the notification; receiving an operation at the remote location when the user location is different from the remote location; and generating an alert based on the operation for displaying on the device.

17 Claims, 8 Drawing Sheets

NAVIGATION SYSTEM WITH NOTIFICATION AND METHOD OF OPERATION THEREOF

TECHNICAL FIELD

The present invention relates generally to a navigation system, and more particularly to a system for a navigation system with notification.

BACKGROUND ART

Modern portable consumer and industrial electronics provide increasing levels of functionality to support modern life including location-based information. This is especially true for client devices such as navigation systems, cellular phones, portable digital assistants, and multifunction devices.

As users adopt mobile location-based devices, new and old usage begins to take advantage of this new device space. There are many solutions to take advantage of this new device opportunity. One existing approach is to use location information to provide navigation services, such as a global positioning service (GPS) navigation system for a mobile device.

Navigation system and service providers are continually making improvement in the user's experience in order to be competitive. In navigation services, demand for better usability is increasingly important.

Thus, a need still remains for a navigation system with notification mechanism for improving the usability. In view of ever-increasing added features desired by consumers in their mobile devices, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: receiving a notification associated with a remote location; detecting a user location for locating a device; detecting the user location at the remote location based on the notification; receiving an operation at the remote location when the user location is different from the remote location; and generating an alert based on the operation for displaying on the device.

The present invention provides a navigation system, including: a first communication unit for receiving a notification associated with a remote location; a location unit, coupled to the first communication unit, for detecting a user location for locating a device; a first storage unit, coupled to the location unit, for detecting the user location at the remote location based on the notification, the user location stored and accessed in the first storage unit; a user interface, coupled to the first storage unit, for receiving an operation at the remote location when the user location is different from the remote location; and a first control unit, coupled to the user interface, for generating an alert based on the operation for displaying on the device.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

Figure 1:
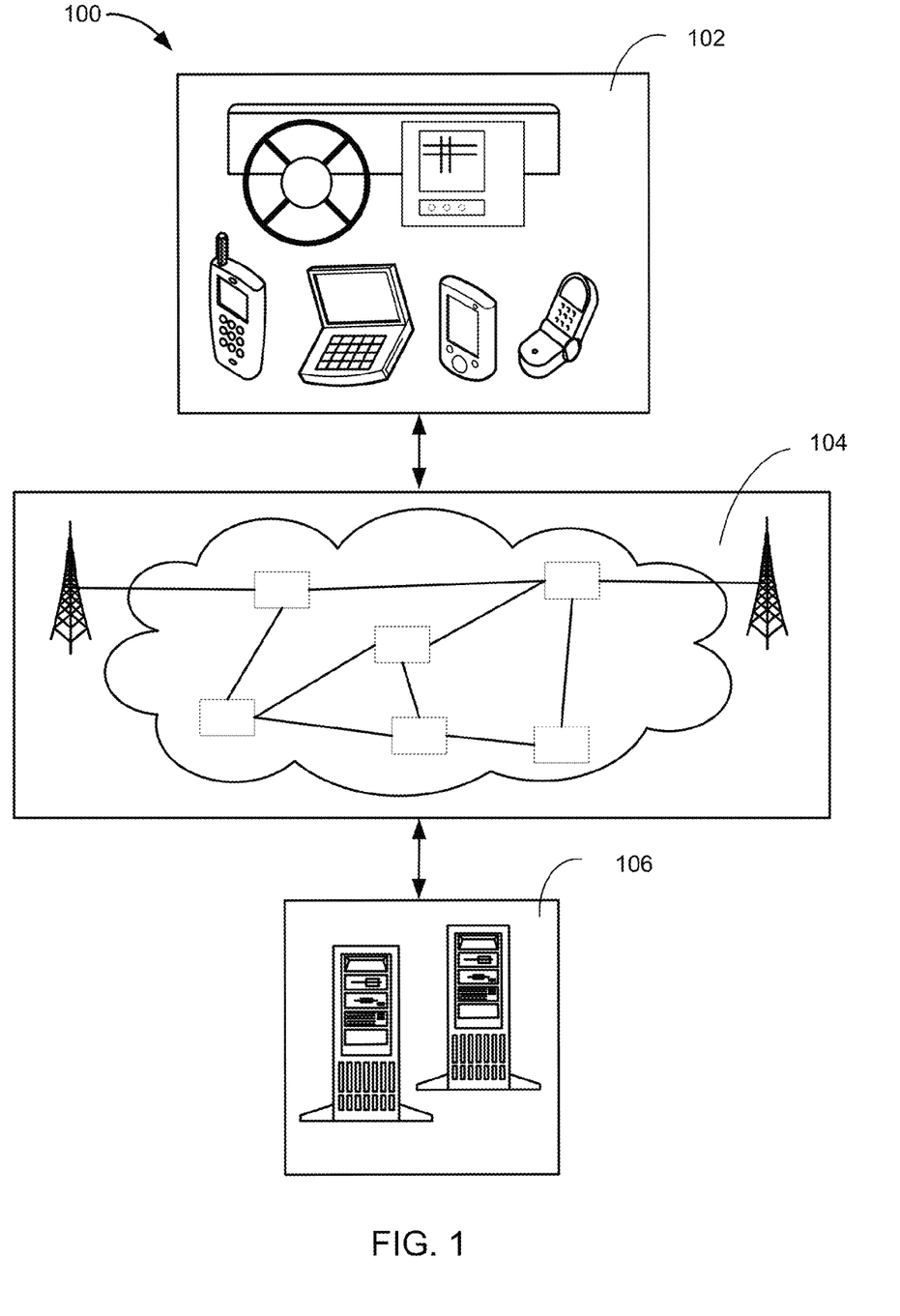
FIG. 1 is a navigation system with notification mechanism in an embodiment of the present invention.

Referring now to FIG. 1, therein is shown a navigation system 100 with notification mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can have a means for coupling with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
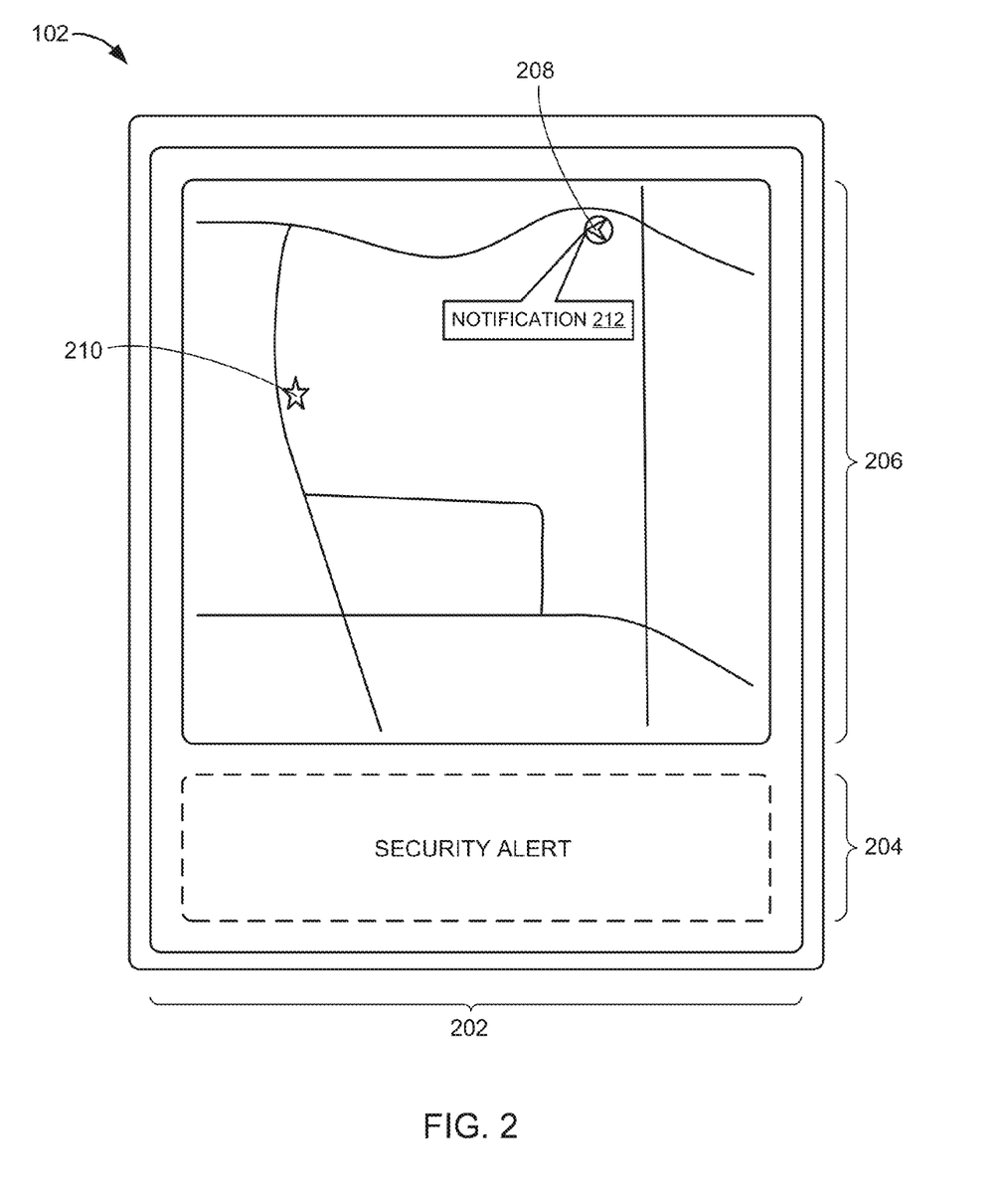
FIG. 2 is an example of a display on a display interface of the first device.

Referring now to FIG. 2, therein is shown an example of a display on a display interface 202 of the first device 102. The display is defined as a visual presentation of navigation information. For example, the navigation information can be a map, a street name, a turn-by-turn instruction, or any relevant information for navigation purposes.

The display interface 202 is defined as a portion of the first device 102 that presents the navigation information in a visual form, audio form, or a combination thereof. The display interface 202 can include a display device, a projector, a video screen, or any combination thereof.

The display interface 202 can depict an alert 204, which presents a security warning to inform users of potential issues. For illustrative purposes, the alert 204 is shown as text, although the alert 204 can be presented with audio, images, or video, as examples.

The display interface 202 can depict a navigation map 206, which is a visual presentation of an area. For example, the navigation map 206 can depict a user location 208 of the first device 102 and a remote location 210. The user location 208 is defined as a user location for the user of the first device 102. The remote location 210 is defined as a location away from the user location 208 at the time a notification 212 is received at the first device 102. The notification 212 defined as a message related to the remote location 210. The notification 212 can be delivered in a number of forms or formats, such as text, audio, image, or a combination thereof. Also for example, the alert 204 can be presented to inform the users of the potential issues at the remote location 210.

Besides the alert 204, the display interface 202 can present other information or messages that are associated with the remote location 210. The information associated with the remote location 210 can be sent to the first device 102 when the user location 208 is at a predetermined distance away from the remote location 210.

Subsequently, if the user location 208 is detected to be at or near the remote location 210, it can be determined that the user location 208 at or near the remote location 210 can be based on the information associated with the remote location 210. In other words, after the user of the first device 102 receives the information associated with the remote location 210, the user can travel to the remote location 210, resulting in the user location 208 at or near the remote location 210.

At the remote location 210, the user can perform an action. For example, the action can be a purchase of a product or a service at the remote location 210. If an action is performed at the remote location 210 and the action is associated with an identity of the user, the alert 204 can be depicted by the display interface 202 to warn the user of a potential issue. The alert 204 can be depicted when the user location 208 is different from the remote location 210 at a time when the action is performed at the remote location 210.

Figure 3:
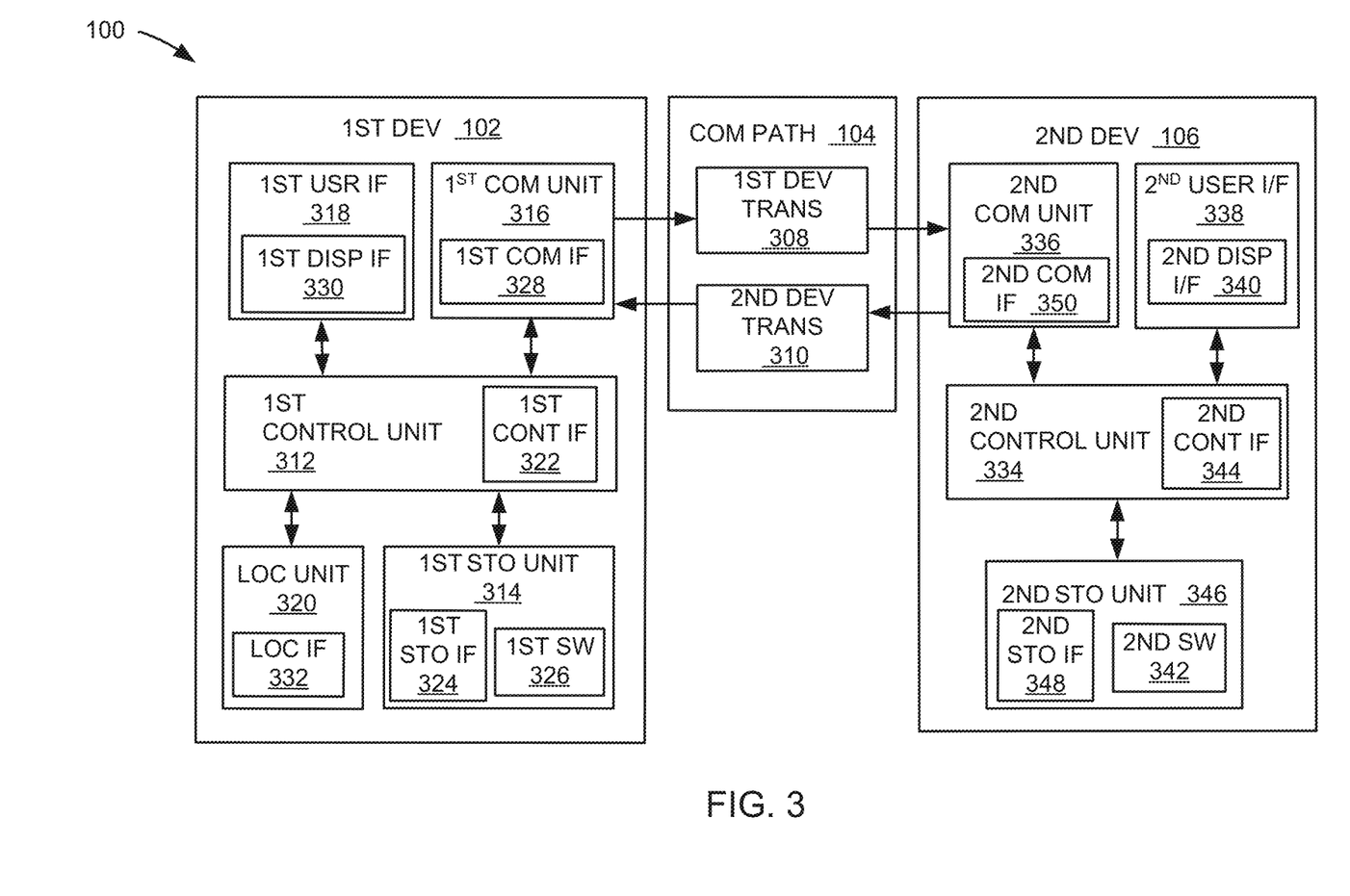
FIG. 3 is an exemplary block diagram of the navigation system.

Referring now to FIG. 3, therein is shown an exemplary block diagram of the navigation system 100. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first control unit 312 can include a first control interface 322. The first control unit 312 can execute a first software 326 to provide the intelligence of the navigation system 100.

The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof.

The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof. The first display interface 330 can be represented by the display interface 202 of FIG. 2.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 106. The second control interface 344 can also be used for communication that is external to the second device 106.

The second control interface 344 can receive information from the other functional units or from external sources, or can transmit information to the other functional units or to external destinations. The external sources and the external destinations refer to sources and destinations external to the second device 106.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. In addition, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
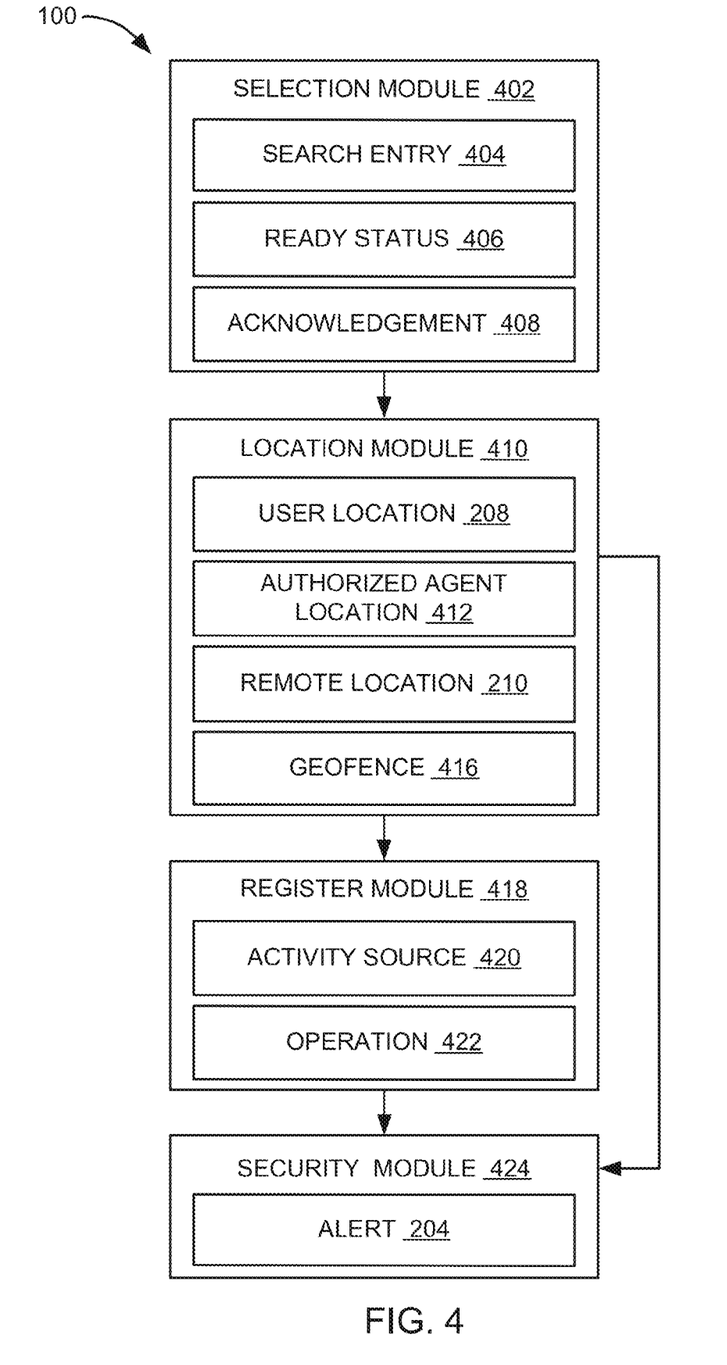
FIG. 4 is a flow chart of the navigation system.

Referring now to FIG. 4, therein is shown a flow chart of the navigation system 100. The navigation system 100 can include a selection module 402, which allows a user to perform a search of a point of interest to where the user would like to travel. For example, the point of interest can be a gas station, a restaurant, a store, a rest area, or a post office.

The selection module 402 performs searches of the point of interest or receives information for the point of interest. The search can be performed with a search entry 404, defined as a user input that is related to the point of interest. For example, the search entry 404 can be a search parameter including a distance, a location, a keyword, or a category of information. The selection module 402 can also receive information by the notification 212 of FIG. 2 for the point of interest. The remote location 210 is an example for the point of interest.

The selection module 402 can present a ready status 406, which indicates that the searches are completed or the notification 212 has been received. The ready status 406 can be presented along with a search result of the searches performed based on the search entry 404.

The selection module 402 can receive an acknowledgement 408 of the ready status 406. The acknowledgement 408 is defined as a response from the user upon receiving the search result or the notification 212. The acknowledgement 408 is optional.

The selection module 402 can be implemented with the first device 102, the second device 106, or a combination thereof. For example, the selection module 402 can be implemented with the first control unit 312 of FIG. 3, the first storage unit 314 of FIG. 3, the first communication unit 316 of FIG. 3, the first user interface 318 of FIG. 3, the location unit 320 of FIG. 3, the second control unit 334 of FIG. 3, the second communication unit 336 of FIG. 3, the second user interface 338 of FIG. 3, the second storage unit 346 of FIG. 3, or a combination thereof.

As an example, the selection module 402 can include or operate the first communication unit 316 to receive the notification 212 associated with the remote location 210. As another example, the selection module 402 can include or operate the first user interface 318 to receive the acknowledgement 408 from the user after the notification 212 is presented.

The navigation system 100 can include a location module 410, coupled to the selection module 402. The location module 410 detects and tracks the user location 208 for locating a device, the remote location 210, or a combination thereof. The device can be represented by the first device 102 of FIG. 1 or the second device 106 of FIG. 1.

The search result can be confirmed by the acknowledgement 408. Upon receiving the acknowledgement 408, the location module 410 can generate a navigation instruction to guide a user of the navigation system 100 or the first device 102.

The navigation instruction can guide the user from the user location 208 to the remote location 210 associated with the search result or the notification 212. The user can travel to the remote location 210. The location module 410 can detect when the user location 208 is within a geofence 416, which is defined as a predetermined perimeter that surrounds the remote location 210. For example, the remote location 210 can be a location of an advertiser, for which the search result is promoted.

The location module 410 can also detect an authorized agent location 412, which is a user location of a spouse or an authorized person who is permitted to perform an activity on behalf of the user. The authorized agent location 412 can be tracked in a number of ways, including with another of the first device 102 used by the authorized agent (not shown).

The location module 410 can be implemented with the first device 102, the second device 106, or a combination thereof. For example, the location module 410 can be implemented with the first control unit 312 of FIG. 3, the first storage unit 314 of FIG. 3, the first communication unit 316 of FIG. 3, the first user interface 318 of FIG. 3, the location unit 320 of FIG. 3, the second control unit 334 of FIG. 3, the second communication unit 336 of FIG. 3, the second user interface 338 of FIG. 3, the second storage unit 346 of FIG. 3, or a combination thereof.

For example, the location module 410 can include or operate the location unit 320 to detect and track the user location 208, the authorized agent location 412, the remote location 210, or a combination thereof as well as the first control unit 312 of FIG. 3, which can execute the first software 326 of FIG. 3 to control the location unit 320. Also for example, the user location 208 can be stored and accessed in the first storage unit 314 or the second storage unit 346.

A register module 418, coupled to the location module 410, monitors a user who uses the navigation system 100 or as a more specific example the first device 102 and monitors responses to the search result or the notification 212. The register module 418 can monitor the user by recording and checking an activity source 420, which is an originator of an action or some identifiable attributable or associated with the originator. For example, the activity source 420 can establish an identity of the user for whom the searches are performed.

In response to the search result or the notification 212, the user can perform an operation 422, which is defined as an action or an activity. The operation 422 can be associated with the activity source 420. For example, the user can be a customer, established as the activity source 420, who buys a product or a service and the operation 422 is the purchase made by the customer. The register module 418 will subsequently be described in more details.

The register module 418 can be implemented with the first device 102, the second device 106, or a combination thereof. For example, the register module 418 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, the second storage unit 346 of FIG. 3, or a combination thereof.

A security module 424, coupled to the location module 410 and the register module 418, reports the alert 204 based on the user location 208, the remote location 210, and the activity source 420. With the operation 422 recorded as being associated with the activity source 420 as the user using the device operating the navigation system 100, the alert 204 can be generated when the user location 208 of the device is outside of the geofence 416.

The security module 424 can be implemented with the first device 102, the second device 106, or a combination thereof. For example, the security module 424 can be implemented with the first control unit 312 of FIG. 3, the first storage unit 314 of FIG. 3, the first communication unit 316 of FIG. 3, the first user interface 318 of FIG. 3, the second control unit 334 of FIG. 3, the second communication unit 336 of FIG. 3, the second user interface 338 of FIG. 3, the second storage unit 346 of FIG. 3, or a combination thereof. Also for example, the security module 424 can include or operate the first control unit 312 to generate the alert 204.

It has been discovered that the navigation system 100 improves security with the alert 204 generated when the user location 208 is different from the remote location 210 when the operation 422 is performed with the activity source 420.

Figure 5:
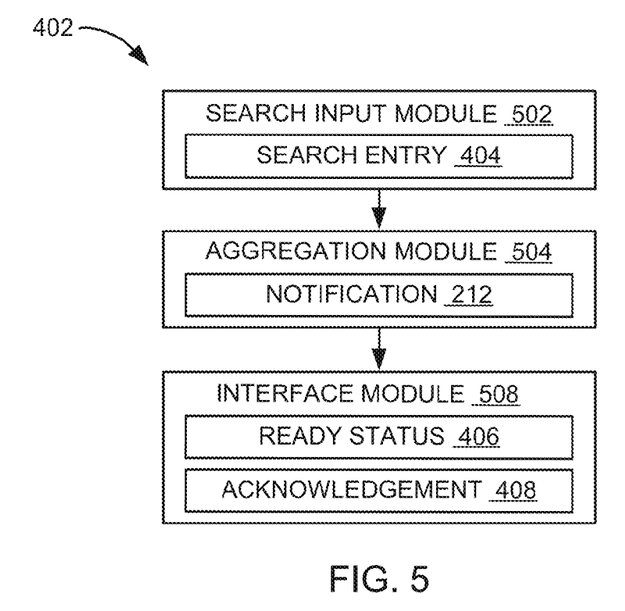
FIG. 5 is a flow chart of the selection module.

Referring now to FIG. 5, therein is shown a flow chart of the selection module 402. The selection module 402 can include a search input module 502, which receives the search entry 404 from a user for a search related to a point of interest to where the user would like to travel.

The selection module 402 can include an aggregation module 504, which searches for the point of interest based on the search entry 404 or a personal preference. The personal preference is defined as items, categories of interest, or places the user of the navigation system 100 has elected the option to receive information matching the personal preference elections. The aggregation module 504 generates the notification 212. The aggregation module 504 can be coupled to the search input module 502.

The notification 212 can be associated with the activity source 420 of FIG. 4. The notification 212 can be the search result generated for the activity source 420. The notification 212 can be information received from an information aggregator.

For example, the notification 212 can represent a point of interest (POI). Also for example, the notification 212 can be a location-based advertisement that promotes products or services.

The notification 212 can be associated with the remote location 210 of FIG. 2. The user location 208 of FIG. 2 can be detected at the remote location 210 based on the notification 212. In other words, after receiving the notification 212, the user can select to travel to the remote location 210, resulting in the user location 208 at the remote location 210.

For example, the notification 212 can be related to a point of interest (POI) and the remote location 210 can be a geographical location of the point of interest. Also for example, the notification 212 can be an advertisement for an advertiser and the remote location 210 can indicate where the address of the advertiser is.

For example, the aggregation module 504 can be implemented with the first device 102 of FIG. 1 or the second device 106 of FIG. 1. As a specific example, the aggregation module 504 can be executed within an advertisement server. As another specific example, the aggregation module 504 can receive information related to the point of interest from a third party advertisement aggregator or a locally hosted advertisement aggregator to generate the notification 212 to give advertisers and publishers an ability to provide targeted and personalized advertising.

An interface module 508, coupled to the aggregation module 504, receives and presents the notification 212 on the first device 102 or more generally to the navigation system 100. The interface module 508 can generate the ready status 406 to indicate that the notification 212 is available and can include the search result.

For example, the interface module 508 can include or utilize the display interface 202 of FIG. 2 to present the ready status 406, the notification 212, or a combination thereof. Also for example, the interface module 508 can include or operate the first control unit 312 of FIG. 3, which can execute the first software 326 of FIG. 3 to control the display interface 202. Further, for example, the interface module 508 can include or operate the first communication unit 316 of FIG. 3 to receive the notification 212 from the aggregation module 504.

The interface module 508 can receive the acknowledgement 408 after the ready status 406 and the notification 212 are presented. For example, the acknowledgement 408 can include a response generated by a user clicking or selecting the notification 212 presented on the device or even a time-out period. The time-out period is defined as a predetermined time in which if a user does not click or select the notification 212 then the acknowledgment 408 can be set by a passage of time beyond the time-out period from the time the notification 212 is received at the first device 102. Also for example, the notification 212 can be viewed and acknowledged while a user serves the web or uses mobile applications and services with the device.

Figure 6:
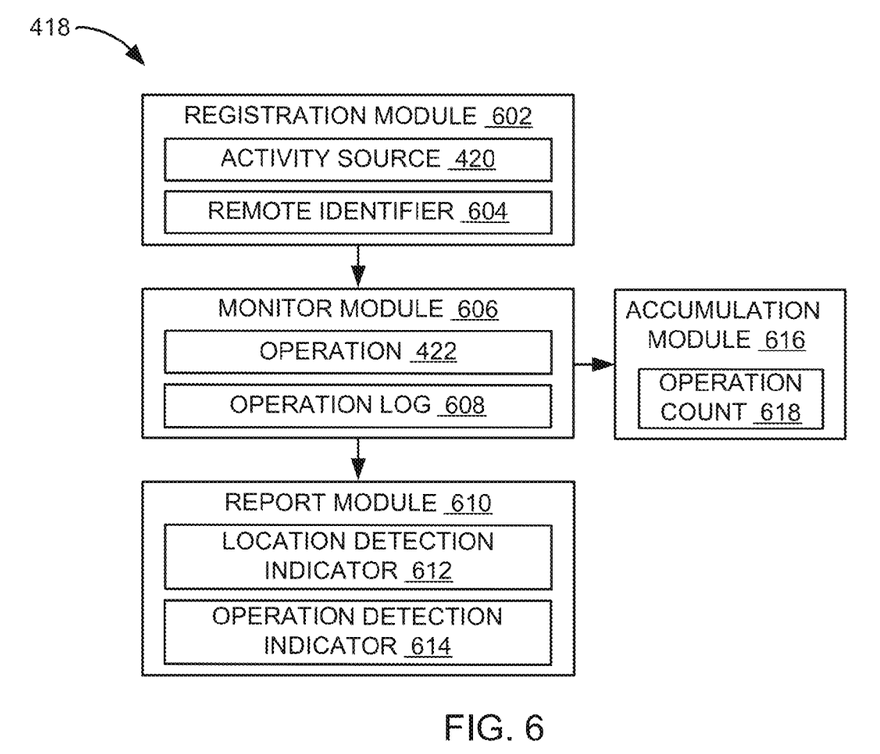
FIG. 6 is a flow chart of the register module.

Referring now to FIG. 6, therein is shown a flow chart of the register module 418. The register module 418 can include a registration module 602 to record the activity source 420. The activity source 420 can establish the identity of the user of the device. The activity source 420 can be provided by the user or automatically associated with the user of the first device 102 of FIG. 1 by the navigation system 100.

For example, the activity source 420 can include an account number, a credit card number, or an identification of a card that is used for payments. Also for example, the user can provide the activity source 420 when the user signs up with a rewards network website.

As an example, the user can register the activity source 420 with a third party company that tracks transactions. As another example, the user can register the activity source 420 either with a credit card number or signing up for a rewards card when signing up for a web or mobile service.

During a registration process, the registration module 602 can record a remote identifier 604, which establishes an identity at the remote location 210 of FIG. 2. The remote identifier 604 can be related to the notification 212 of FIG. 2. For example, the remote identifier 604 can be a merchant name of an advertiser for whom the notification 212 is selected.

A monitor module 606, coupled to the location module 410 of FIG. 4 and the registration module 602, records the operation 422 that is associated with the activity source 420. For example, the monitor module 606 can receive the operation 422 performed by the user associated with the activity source 420 that is recorded by the registration module 602. Also for example, the operation 422 can be a purchase for which the user uses a credit card or a discount card that is registered by the registration module 602.

The user can use a device, such as the first device 102 or the second device 106 of FIG. 1, to perform the operation 422 that is to be recorded at the remote location 210. For example, the monitor module 606 can include the first user interface 318 of FIG. 3 to receive the operation 422 performed by the user. Also for example, the operation 422 can include a transaction that is made by the user with a credit card.

The monitor module 606 can create an operation log 608, defined as a record to keep track of the operation 422. The operation log 608 can indicate that the operation 422 performed is associated with the activity source 420 of the user of the device, which can be at the remote location 210 or within the geofence 416 of FIG. 4.

The monitor module 606 can record the operation 422 along with the activity source 420 in the operation log 608. For example, the operation log 608 can include a third party transaction tracker database. Also for example, usage of mobile applications can be promoted with the mobile applications displaying the notification 212 including advertisements on the device.

For example, the purchase can be physically made by the user while at the remote location 210. Also for example, the operation log 608 can include a transaction record, transaction data, or information about a purchase.

As an example, the operation log 608 can include the merchant name. As another example, the operation log 608 can be generated and stored by the monitor module 606 so that the operation log 608 can be processed by a publisher to determine a pricing point to charge an advertiser. Also as another example, the publisher can look for the merchant name of the advertiser recorded in the operation log 608 of the operation 422. As a further example, a third party can use the operation log 608 to keep track of the operation 422 including a purchase that is made with the activity source 420 associated with a purchasing cards, such as a credit card, a debit card, a reward card, or any financial account card.

A report module 610, coupled to the location module 410 and the monitor module 606, indicates tracking results for the user location 208 of FIG. 2 and the operation 422. The report module 610 can generate a location detection indicator 612, defined as a state of the user location 208 at the time of the operation log 608. The location detection indicator 612 can be generated by tracking the user location 208.

The location detection indicator 612 can be generated based on the user location 208. The location detection indicator 612 can be generated by detecting that the user location 208 is at the remote location 210 or within the geofence 416.

With the acknowledgement 408 of FIG. 4 received from the user using the interface module 508 of FIG. 5 or after the time-out period and the location detection indicator 612 detected by the report module 610, it can be verified that the user arriving at the remote location 210 is due to the notification 212 that is presented to the user by the interface module 508. In other words, when the user receives the notification 212, the user can acknowledge that the user receives the notification 212 by entering the acknowledgement 408 using the interface module 508 or allow the time-out period to pass and drive to the remote location 210 associated with the notification 212.

If the user enters the acknowledgement 408, the user can travel to the remote location 210 based on location information associated with the notification 212. For example, the location information can include an address of the remote location 210. If the acknowledgement 408 occurs after the time-out period, then the navigation system 100 can also generate the travel route to the remote location 210 associated with the notification 212.

After the report module 610 detects that the user is at the remote location 210 or within the geofence 416 surrounding the remote location 210, the navigation system 100 can be verified that the user arriving at the remote location 210 is the user who receives the notification 212.

The report module 610 can generate an operation detection indicator 614, which is defined as a notification of the operation 422. The report module 610 can generate the operation detection indicator 614 to notify a tracking result of the operation 422.

The operation detection indicator 614 can be presented based on the operation log 608. In other words, the operation detection indicator 614 can indicate that the operation 422 performed is associated with the activity source 420 of the user of the device with the user location 208 thereof at the remote location 210 or within the geofence 416.

With the acknowledgement 408, the location detection indicator 612, and the operation detection indicator 614, the user arriving at the remote location 210 or within the geofence 416 due to the user viewing the notification 212 can be confirmed. With the operation log 608, effectiveness of presenting the notification 212 can be quantitatively measured.

The location detection indicator 612 and the operation detection indicator 614 can be used to determine pricing points that the publisher can charge the advertiser. For example, the location detection indicator 612 and the operation detection indicator 614 can be used to determine a first pricing point and a second pricing point, respectively. The first pricing point can have a lesser charge value than the second pricing point since the advertiser pays a premium if the user makes a purchase.

An accumulation module 616, coupled to the monitor module 606, records an operation count 618, defined as a number of times the operation 422 was performed. The operation count 618 can be associated with the activity source 420.

The operation count 618 can be accumulated each time the operation 422 is performed with the activity source 420. For example, the operation count 618 can be rewards points that the user can accumulate with every purchase transaction. Also for example, the rewards points can be traded in or redeemed as an exclusive offer or a discount.

It has been discovered that the navigation system 100 of FIG. 1 provides an effective presentation of the notification 212 with the location detection indicator 612 and the operation detection indicator 614, thereby confirming that the user arriving at the remote location 210 or within the geofence 416 is due to the user viewing the notification 212.

Figure 7:
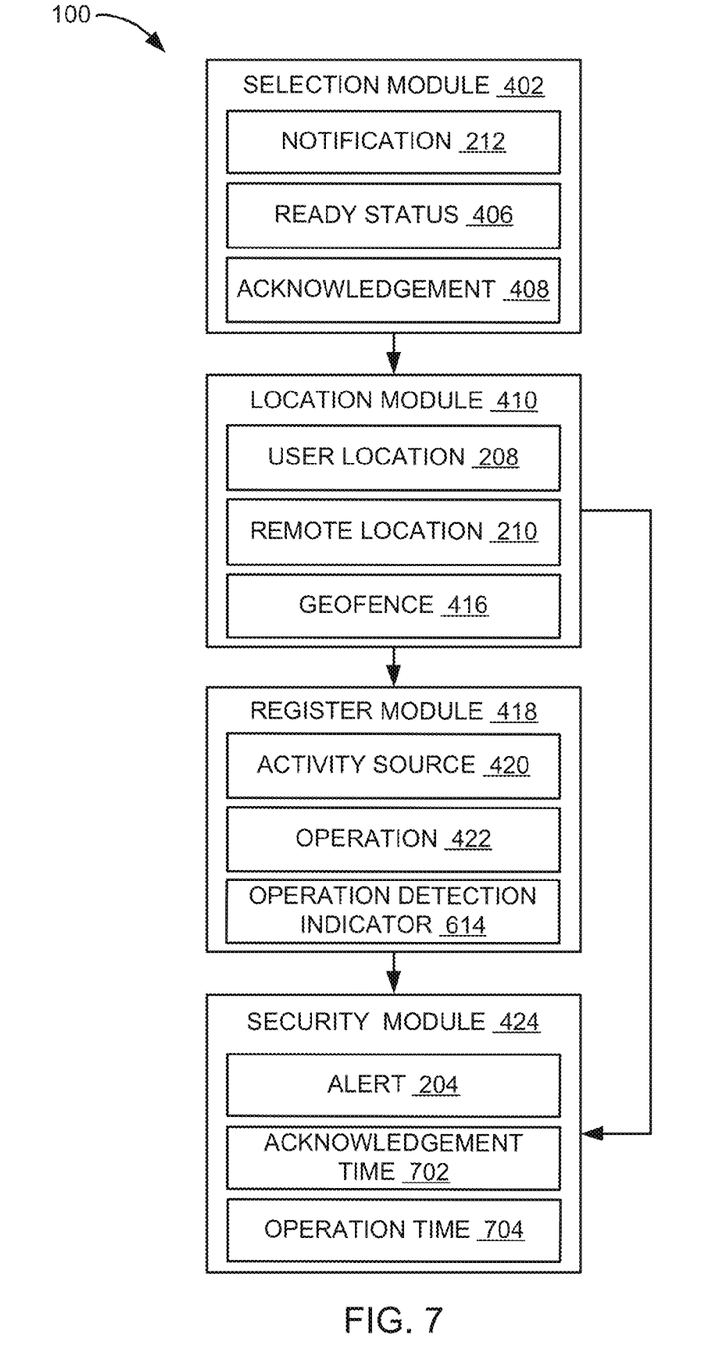
FIG. 7 is a flow chart of a portion of the navigation system in a protection process.

Referring now to FIG. 7, therein is shown a flow chart of a portion of the navigation system 100 in a protection process. The selection module 402, the location module 410, the register module 418, and the security module 424 provides the functions as described above for the protection process unless otherwise stated below. The notification 212 along with the ready status 406 can be presented by the selection module 402.

The selection module 402 can receive the acknowledgement 408 from the user in response to the ready status 406 or through the passage of the time-out period. The selection module 402 can notify the security module 424 that the acknowledgement 408 is received.

The security module 424 can generate an acknowledgement time 702, which is defined as a time that indicates when the ready status 406 for the notification 212 is acknowledged. The acknowledgement time 702 can be recorded with a time of day, a calendar day, a relative time in relation to the notification 212 received by the first device 102, or a combination thereof.

The register module 418 can record the operation 422 along with the activity source 420 that is used to perform the operation 422. For example, the operation 422 can be performed either by phone or through a web site or live at the remote location 210.

The operation 422 can be performed based on the notification 212 presented. The security module 424 can record an operation time 704, which is defined as a time that indicates when the operation detection indicator 614 of FIG. 6 is recorded. The operation time 704 can be recorded for the operation 422 with a time of day, a calendar day, a relative time in relation to the notification 212 received by the first device 102, or a combination thereof. For example, the security module 424 can include or operate the first storage unit 314 of FIG. 3 or the second storage unit 346 of FIG. 3 to record the operation time 704 for the operation 422.

The security module 424 can generate and present the alert 204 based on the acknowledgement 408, the user location 208 detected by the location module 410, the remote location 210, and the operation 422 received by the register module 418. After the acknowledgement 408 is received by the selection module 402, the alert 204 can be generated if the user location 208 is different from the remote location 210 and the operation 422 is performed with the activity source 420. The user location 208 can be different from the remote location 210 when the user location 208 is away from the remote location 210 and outside of the geofence 416.

The alert 204 can be generated based on the acknowledgement time 702 and the operation time 704. In other words, the alert 204 can be generated if the operation time 704 is recorded after the acknowledgement time 702 is recorded and the user location 208 is different from the remote location 210.

Figure 8:
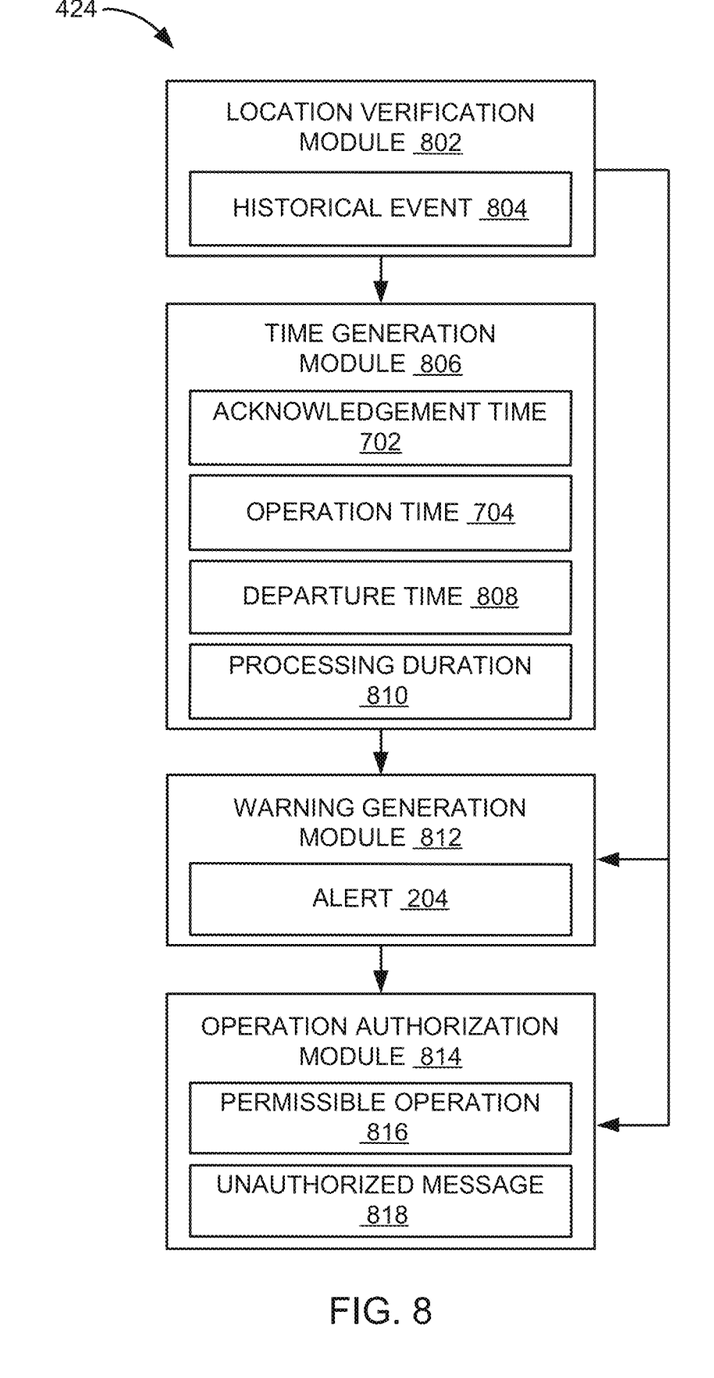
FIG. 8 is a flow chart of the security module.

Referring now to FIG. 8, therein is shown a flow chart of the security module 424. The security module 424 can include a location verification module 802, which validates the user location 208 of FIG. 2.

The location verification module 802 can verify the user location 208 before the alert 204 is sent. The location verification module 802 verifies the user location 208 so that the alert 204 is not reported falsely or unnecessarily.

The location verification module 802 can verify the user location 208 by checking if the user location 208 is at or different from the remote location 210 of FIG. 2. The location verification module 802 can verify the user location 208 by validating that the user location 208 is fixed before the alert 204 is sent. The location verification module 802 can validate that the user location 208 is fixed by monitoring the user location 208 being static or not changed during a predetermined time segment. The location fix during the predetermined time segment prevents errant location fix for the user location 208 from inadvertently sending the alert 204 that is false.

The predetermined time segment is defined as a period of time when the location fix can be made and depends on the item to which the fix is to be made. If the item is moving at a rapid speed or if there have been numerous errant location fixes, the predetermined time segment is extended than if there has been very few or no errant location fix or if the item is stationary or moving slowly.

Besides verifying the user location 208 of the device, the location verification module 802 can verify the authorized agent location 412 of FIG. 4. The authorized agent location 412 can be detected by the location module 410 of FIG. 4 for locating another of the first device 102 of FIG. 1.

The authorized agent location 412 can be at the remote location 210 based on the notification 212 of FIG. 5. In other words, the authorized agent location 412 can be at the remote location 210 after the another of the first device 102 receives the notification 212 indicating where the remote location 210 is located.

The location verification module 802 can verify the user location 208 with a historical event 804, which is defined as an occurrence when the user performed the operation 422 of FIG. 4 at the remote location 210 at a time of day in the past. The historical event 804 is based on the user's past behavior. The historical event 804 is used to detect for consistency to the operation 422 that was performed in the past before the security module 424 reports the alert 204 to filter unnecessary alerts.

For example, the historical event 804 includes an occurrence when the user performed the operation 422 when he or she drove home from work. The user remotely performed the operation 422 by making a phone call to someone associated with the point of interest at the remote location 210. As such, the user was not physically at the remote location 210, resulting in the user location 208 away from the remote location 210 when the operation 422 was performed.

For example, the location verification module 802 can include or operate the first control unit 312 of FIG. 3 to verify the user location 208 before the alert 204 is sent. Also for example, the location verification module 802 can include or operate the first control unit 312 of FIG. 3 to verify the user location 208 with the historical event 804.

The security module 424 can include a time generation module 806, which records and processes a time associated with the notification 212, the operation 422, or the first device 102. The time generation module 806 can be coupled to the location verification module 802. The time generation module 806 can record the acknowledgement time 702 as a point in time associated with the notification 212.

The acknowledgement time 702 can indicate when the ready status 406 of FIG. 4 for the notification 212 is entered by the user or after the time-out period after the notification 212. The time generation module 806 can record the acknowledgement time 702 by capturing and storing a time of day, a day of a year, a relative time, or a combination thereof when the user acknowledges that he or she receives the notification 212.

The time generation module 806 can record the operation time 704 as a point in time associated with the operation 422. The operation time 704 can be recorded when the operation detection indicator 614 of FIG. 6 is generated.

The time generation module 806 can record a departure time 808, which is defined as a point in time at which the user location 208 is just away from the remote location 210. The term "just away" referred to herein means that the user location 208 is at the remote location 210 and is subsequently changed to be at least at a predetermined distance from the remote location 210 or just exited the geofence 416 of FIG. 4 associated with the remote location 210. The departure time 808 can be recorded to indicate when the user leaves the remote location 210.

The time generation module 806 can process the operation time 704 by comparing the operation time 704 with the departure time 808 and a processing duration 810, which is defined as time segment during which the operation 422 performed by the user is expected to be recorded. The departure time 808 and the operation time 704 can be compared to evaluate if the operation time 704 occurs within the processing duration 810, which starts from the departure time 808.

For example, the time generation module 806 can include or operate the first storage unit 314 of FIG. 3 to record the operation time 704 or the departure time 808. Also for example, the time generation module 806 can include or operate the first control unit 312 of FIG. 3 or the second control unit 334 of FIG. 3 to compare the departure time 808 and the operation time 704 or to comparing the processing duration 810. Further, for example, the time generation module 806 can include or operate the first communication unit 316 of FIG. 3 or the second communication unit 336 of FIG. 3 to record the departure time 808.

The security module 424 can include a warning generation module 812, which generates and presents the alert 204 to the user. The warning generation module 812 can be coupled to the location verification module 802 and the time generation module 806. The alert 204 can be generated after the user location 208 is validated by the location verification module 802.

The alert 204 can be generated to warn the user of a potential issue when the operation 422 is performed at the remote location 210 as recorded by the monitor module 606 of FIG. 6 and the user location 208 or the authorized agent location 412 is different from the remote location 210 as determined by the location verification module 802. For example, the potential issue can be the operation 422 being performed by an unauthorized user.

When the user location 208 or the authorized agent location 412 is at the remote location 210 and the operation 422 is performed, it can be determined that the user or the authorized person, respectively, performs the operation 422 at the remote location 210. In such a case, the alert 204 does not have to be sent to warn the user of a potential issue. Instead, an informational message can be optionally generated by the warning generation module 812 to let the user know that the operation 422 has been performed at the remote location 210.

The warning generation module 812 can determine if the alert 204 is to be generated after the location verification module 802 verifies if the user location 208 is fixed. If the user location 208 is fixed at the remote location 210 during the predetermined time segment, the warning generation module 812 can determine that it is not necessary to generate the alert 204 after the operation is performed at the remote location 210. In this case, the operation 422 can be likely performed by the user since the user has been at the remote location 210.

If the user location 208 is not fixed at the remote location 210 during the predetermined time segment, the warning generation module 812 can determine that it is necessary to generate the alert 204 after the operation is performed at the remote location 210. In this case, the operation 422 can be unlikely performed by the user since the user has not been at the remote location 210 and an unauthorized user can falsify the identity of the user to perform the operation 422.

For example, the user drives to a store at the remote location 210 as advertised by the notification 212, enters the store, and then leaves without purchasing any item at the store. As the user leaves the store, he or she can accidentally drop his or her credit card and someone else subsequently finds and uses the credit card to purchase an item at the store. In this example, the alert 204 can be generated to inform the user about an unauthorized transaction.

The warning generation module 812 can determine that the alert 204 does not have to be generated when the location verification module 802 verifies the user location 208 with the historical event 804. The location verification module 802 can verify that the user location 208 is consistent to the historical event 804. Otherwise, the warning generation module 812 can generate the alert 204 if the user location 208 is not consistent to the historical event 804.

As described in a previous example of the historical event 804, the user remotely performed the operation 422 without being at the remote location 210. In this example, the warning generation module 812 does not generate the alert 204 when the operation 422 is performed while the user location 208 is not at the remote location 210.

The warning generation module 812 can generate the alert 204 by comparing the departure time 808 and the operation time 704. The alert 204 can be generated when the operation time 704 is detected to be after the departure time 808 or after the processing duration 810 since the departure time 808.

In other words, after the user leaves the remote location 210 at the departure time 808, the operation time 704 is expected to be recorded within the processing duration 810. If the operation time 704 does not occur within the processing duration 810, it is likely that the operation 422 is not performed by the user. For example, the warning generation module 812 can include or operate the first control unit 312 of FIG. 3 or the second control unit 334 of FIG. 3 to detect the operation time 704 to be after the departure time 808 or after the processing duration 810.

The security module 424 can include an operation authorization module 814, which determines validity of the operation 422. The operation authorization module 814 can be coupled to the location verification module 802 and the warning generation module 812. The operation 422 is determined as valid when the operation 422 is verified as performed by the user or the authorized user on behalf of the user.

The operation authorization module 814 can determine the operation 422 as valid based on the historical event 804. In the previous example of the historical event 804, the operation authorization module 814 can determine that the operation 422 is valid even when the user location 208 is away from the remote location 210 since the user remotely performed the operation 422 in the past.

The operation authorization module 814 can verify a permissible operation 816, which is defined as a valid activity. The permissible operation 816 can be verified as valid by checking that the permissible operation 816 is associated with the operation 422 and the permissible operation 816 is performed after the operation 422 occurs.

For example, the user dines at a restaurant at the remote location 210, performs the operation 422 by using a credit card to pay the bill, and leaves the restaurant. A restaurant employee subsequently performs the permissible operation 816 by charging a tip for a service using the credit card after the user leaves the restaurant. In this example, the permissible operation 816 is the tip charged and recorded for the service rendered to the user and the permissible operation 816 is associated with the operation 422 using the same information from the credit card.

The operation authorization module 814 can stop the operation 422 if the alert 204 is needed. The operation 422 can be stopped to prevent invalid or unauthorized operations. The operation authorization module 814 can stop the operation 422 by generating and sending an unauthorized message 818 to the remote location 210. The unauthorized message 818 is defined as information indicating that the operation 422 is invalid.

For example, the unauthorized message 818 can indicate that a payment transaction is denied or a reason for a decline. Also for example, upon receiving the unauthorized message 818, a business at the remote location 210 can refuse to provide service or sell a product.

For example, the operation authorization module 814 can include or operate the first control unit 312 of FIG. 3 to stop the operation 422 if the alert 204 is needed. Also for example, the operation authorization module 814 can include or operate the first control unit 312 to verify the permissible operation 816.

The navigation system 100 of FIG. 1 can be partitioned between the first device 102 and the second device 106 of FIG. 1. For example, the navigation system 100 can be partitioned into the functional units of the first device 102, the second device 106, or a combination thereof. The navigation system 100 can also be implemented as additional functional units in the first device 102, the second device 106, or a combination thereof.

The physical transformation of presenting the notification 212 based on the search entry 404 of FIG. 4 to performing the operation 422 at the remote location 210 and recording the acknowledgement time 702 and the operation time 704 to presenting the alert 204 when the user location 208 is different from the remote location 210 results in movement in the physical world, such as people using the first device 102, the navigation system 100, or vehicles, based on the operation of the navigation system 100. As the movement in the physical world occurs, the movement itself creates additional information that is converted back to the notification 212 and the alert 204 for the continued operation of the navigation system 100 and to continue the movement in the physical world.

Thus, it has been discovered that the navigation system 100 of the present invention furnishes important and heretofore unknown and unavailable solutions, capabilities, and functional aspects for providing a user-friendly experience and increasing safety.

The navigation system 100 describes the module functions or order as an example. The modules can be partitioned differently. For example, the register module 418 of FIG. 4 can include the registration module 602 of FIG. 6, although the registration module 602 can be a separate module or included in the selection module 402 of FIG. 4. Each of the modules can operate individually and independently of the other modules.

Figure 9:
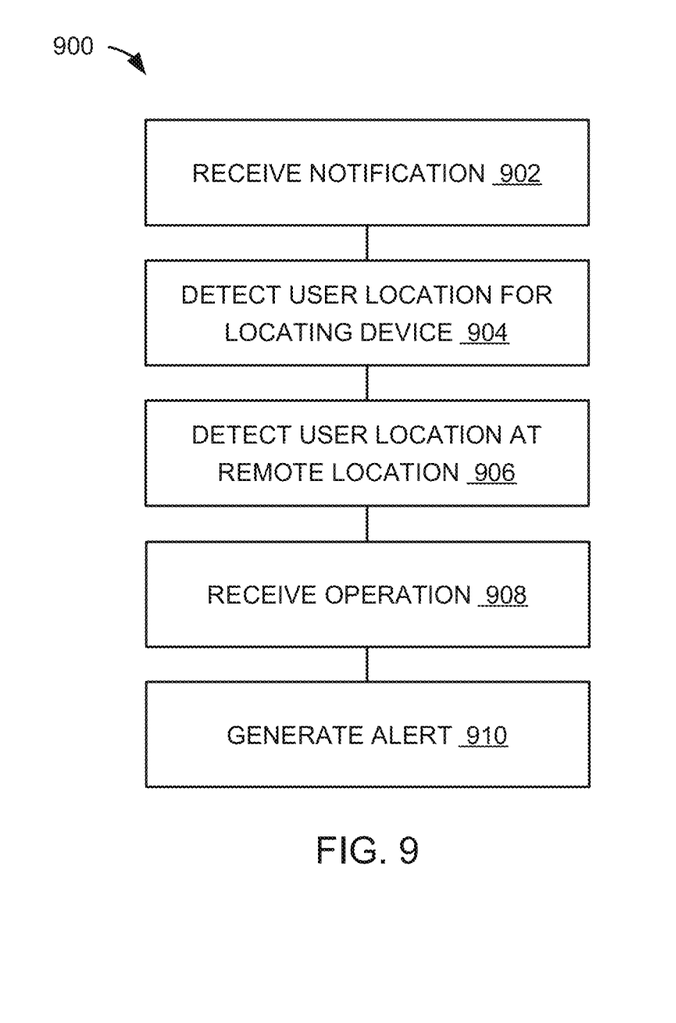
FIG. 9 is a flow chart of a method of operation of the navigation system in a further embodiment of the present invention.

Referring now to FIG. 9, therein is shown a flow chart of a method 900 of operation of the navigation system 100 in a further embodiment of the present invention. The method 900 includes: receiving a notification associated with a remote location in a block 902; detecting a user location for locating a device in a block 904; detecting the user location at the remote location based on the notification in a block 906; receiving an operation at the remote location when the user location is different from the remote location in a block 908; and generating an alert based on the operation for displaying on the device in a block 910.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a navigation system comprising:
   identifying a remote location for representing a location providing a product or a service;
   detecting a user location for locating a device;
   determining a tracking result associated with an operation at the remote location when the user location is different from the remote location; and
   recording an operation time for the operation;
   recording a departure time when the user location is not at the remote location;
   generating an alert, with a control unit, configured to be depicted when the user location is different from the remote location at a time when the operation is performed wherein the operation is for representing a purchase of the product or the service and detecting the operation time to be after the departure time.

2. The method as claimed in claim 1 further comprising verifying the user location before the alert is sent.

3. The method as claimed in claim 1 further comprising verifying the user location with a historical event.

4. The method as claimed in claim 1 further comprising stopping the operation if the alert is needed.

5. A method of operation of a navigation system comprising:
   communicating a notification associated with a remote location for representing a product or a service available at the remote location;
   detecting a user location for locating a device;
   receiving an acknowledgement after the notification is presented;
   determining a tracking result including the user location;
   determining the user location associated with the remote location at a time of an operation for representing a purchase of the product or the service;
   confirming, with a control unit, the notification causing the operation based on the acknowledgement and the user location compared to the remote location at a time when the operation is performed, further in comparison to an initial time of the notification, and
   recording a departure time when the user location is at a predetermined distance from the remote location.

6. The method as claimed in claim 5 further comprising verifying a permissible operation after the operation is performed.

7. The method as claimed in claim 5 further comprising detecting an authorized agent location at the remote location based on the notification.

8. The method as claimed in claim 5 further comprising:
   recording an operation time for the operation;
   recording the departure time when the user location is not at the remote location; and
   wherein confirming includes:
   comparing a processing duration for the operation since the departure time; and
   detecting the operation time to be after the processing duration.

9. A navigation system comprising:
   a first communication unit for receiving a notification associated with a remote location for representing a product or a service available at the remote location;
   a first control unit, coupled to the first communication unit, for:
   detecting a user location for locating a device;
   determining a tracking result associated with an operation at the remote location when the user location is different from the remote location;
   generating an alert configured to be depicted when the user location is different from the remote location at a time when the operation is performed wherein the operation is for representing a purchase of the product or the service; and
   recording a departure time when the user location is at a predetermined distance from the remote location.

10. The system as claimed in claim 9 wherein the first control unit is for verifying the user location before the alert is sent.

11. The system as claimed in claim 9 wherein the first control unit is for verifying the user location with a historical event.

12. The system as claimed in claim 9 wherein the first control unit is for stopping the operation if the alert is needed.

13. The system as claimed in claim 9 further comprising:
    a second storage unit, coupled to the first communication unit, for recording an operation time for the operation;
    a second communication unit, coupled to the second storage unit, for recording the departure time when the user location is not at the remote location; and
    a second control unit, coupled to the second communication unit, for detecting the operation time to be after the departure time.

14. The system as claimed in claim 9 further comprising:
    a user interface coupled to the first control unit, for receiving an acknowledgement after the notification is presented; and
    wherein:
    the first control unit is for generating the alert based on the acknowledgement and the operation for displaying on the device.

15. The system as claimed in claim 14 wherein the first control unit is for verifying a permissible operation after the operation is performed.

16. The system as claimed in claim 14 wherein the location unit is for detecting an authorized agent location at the remote location based on the notification.

17. The system as claimed in claim 14 further comprising:
    a second storage unit, coupled to the first communication unit, for recording an operation time for the operation;
    a second communication unit, coupled to the second storage unit, for recording the departure time when the user location is not at the remote location;
    a second control unit, coupled to the second communication unit, for comparing a processing duration for the operation since the departure time; and
    wherein:
    the first control unit is for detecting the operation time to be after the processing duration.

* * * * *